(12) United States Patent
Choi

(10) Patent No.: US 9,264,394 B2
(45) Date of Patent: Feb. 16, 2016

(54) APPARATUS AND METHOD FOR CONTROLLING PERIPHERAL IN WIRELESS COMMUNICATION SYSTEM USING AN IP ADDRESS

(75) Inventor: Woo-Jun Choi, Hwaseong-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 13/174,372

(22) Filed: Jun. 30, 2011

(65) Prior Publication Data

US 2012/0005298 A1 Jan. 5, 2012

(30) Foreign Application Priority Data

Jun. 30, 2010 (KR) .................. 10-2010-0062555

(51) Int. Cl.
*G06F 15/16* (2006.01)
*H04L 29/12* (2006.01)
*H04L 29/06* (2006.01)

(52) U.S. Cl.
CPC ......... *H04L 61/106* (2013.01); *H04L 29/12896* (2013.01); *H04L 61/605* (2013.01); *H04L 63/08* (2013.01)
USPC ....................................................... 709/208

(58) Field of Classification Search
CPC .............................. H04L 61/10; H04L 61/106
USPC .......................................... 709/220–222, 208
See application file for complete search history.

(56) References Cited

U.S. PATENT DOCUMENTS

| | | | | |
|---|---|---|---|---|
| 4,025,906 A | * | 5/1977 | Riikonen | 710/16 |
| 7,925,740 B2 | * | 4/2011 | Nath et al. | 709/224 |
| 7,995,489 B2 | * | 8/2011 | Ayyagari | 370/252 |
| 8,311,042 B2 | * | 11/2012 | Nath et al. | 370/395.3 |
| 8,423,656 B2 | * | 4/2013 | Lowry et al. | 709/229 |
| 2001/0049746 A1 | * | 12/2001 | Shin | 709/239 |
| 2003/0161332 A1 | | 8/2003 | Ohno et al. | |
| 2005/0273399 A1 | * | 12/2005 | Soma et al. | 705/26 |
| 2006/0245393 A1 | * | 11/2006 | Bajic | 370/331 |
| 2007/0071012 A1 | | 3/2007 | Park et al. | |
| 2008/0151876 A1 | * | 6/2008 | Wilson et al. | 370/352 |

(Continued)

FOREIGN PATENT DOCUMENTS

WO WO 2005/013569 A1 2/2005
WO WO 2008/154067 A1 12/2008

OTHER PUBLICATIONS

Tatsuo Nakajima, et al., "A Virtual Overlay Network for Integrating Home Appliances", Proceedings of the 2002 Symposium on Applications and the Internet, 2002 IEEE, 8 pages.

(Continued)

*Primary Examiner* — Lance L Barry

(57) ABSTRACT

An apparatus and method control a connection between peripheral devices in a control server of a wireless communication system providing an IP-based communication service. The method for controlling the connection between peripheral devices includes registering at least one device in a group list classified by user identification information. The method also includes, if a control node including a user identifier of the group list requests a control of any one device included in the group list, checking an IP address of the device that is requested to be controlled by the control node. The method further includes sending a control command of the control node using the IP address.

20 Claims, 8 Drawing Sheets

(56) References Cited

U.S. PATENT DOCUMENTS

| | | | |
|---|---|---|---|
| 2009/0128852 A1* | 5/2009 | Fujishita | 358/1.15 |
| 2010/0070525 A1* | 3/2010 | Clark et al. | 707/769 |
| 2010/0125894 A1* | 5/2010 | Yasrebi et al. | 726/4 |
| 2010/0157986 A1* | 6/2010 | Rao et al. | 370/352 |
| 2011/0119076 A1* | 5/2011 | Dhoble | 705/2 |
| 2011/0145341 A1* | 6/2011 | Hampel | 709/206 |
| 2011/0175553 A1* | 7/2011 | Sampsell | 315/312 |
| 2011/0231508 A1* | 9/2011 | Torii | 709/208 |
| 2011/0252240 A1* | 10/2011 | Freedman et al. | 713/169 |
| 2013/0043809 A1* | 2/2013 | Weaver | 315/297 |
| 2013/0167253 A1* | 6/2013 | Seleznev et al. | 726/29 |

OTHER PUBLICATIONS

European Search Report dated Oct. 21, 2011 in connection with European Patent Application No. EP 11 17 1920.

European Examination Report dated Feb. 28, 2014 in connection with European Patent Application No. EP 11171920.9.

Summons to Attend Oral Proceedings Pursuant to Rule 115(1) EPC dated Dec. 9, 2014 in connection with European Patent Application No. 11171920.9; 4 pages.

* cited by examiner

APPARATUS AND METHOD FOR CONTROLLING PERIPHERAL IN WIRELESS COMMUNICATION SYSTEM USING AN IP ADDRESS

CROSS-REFERENCE TO RELATED APPLICATION(S) AND CLAIM OF PRIORITY

The present application is related to and claims priority under 35 U.S.C. §119 to an application filed in the Korean Intellectual Property Office on Jun. 30, 2010 and assigned Serial No. 10-2010-0062555, the contents of which are incorporated herein by reference.

TECHNICAL FIELD OF THE INVENTION

The present invention relates generally to an Internet Protocol (IP)-based wireless communication system, and more particularly, to an apparatus and method for controlling peripheral nodes using a control server in an IP-based wireless communication system.

BACKGROUND OF THE INVENTION

In an IP-based wireless communication, when a mobile node is accessed to a network, the mobile node is allocated a dynamic IP address through a Dynamic Host Configuration Protocol (DHCP). Thereafter, the mobile node transmits or receives signals using the allocated IP as an address.

As described above, the mobile node transmits or receives signals using an IP allocated from a network as an address. In other words, a user should know the correspondent's IP address so that the user can communicate with a correspondent node. Accordingly, whenever the correspondent node's IP changes, the user should know the correspondent node's changed IP.

In addition, if a correspondent node a user intends to access has no display device, the user cannot check the correspondent's IP and thus cannot control the correspondent node easily.

SUMMARY OF THE INVENTION

An object of the present invention is to substantially solve at least the above problems and/or disadvantages and to provide at least the advantages below. Accordingly, an object of the present invention is to provide an apparatus and method for controlling peripheral nodes in an IP-based wireless communication system.

Another object of the present invention is to provide an apparatus and method for grouping peripheral nodes using user identification information as a category in an IP-based wireless communication system.

Another object of the present invention is to provide an apparatus and method for grouping peripheral nodes using user identification information as a category in a provider server of an IP-based wireless communication system.

Another object of the present invention is to provide an apparatus and method for registering peripheral nodes in a category of user identification information in an IP-based wireless communication system.

Another object of the present invention is to provide an apparatus and method for connecting a control node and peripheral nodes using group information of the peripheral nodes in a provider server of an IP-based wireless communication system.

According to an aspect of the present invention, a method for controlling a connection between devices in a control server of a wireless communication system providing an IP-based communication service is provided. The method includes registering at least one device in a group list classified by user identification information. The method also includes, if a control node including a user identifier of the group list requests a control of any one device included in the group list, checking an IP address of the device that is requested to be controlled by the control node. The method further includes sending a control command of the control node using the IP address.

According to another aspect of the present invention, an apparatus for controlling a connection between devices in a control server of a wireless communication system providing an IP-based communication service is provided. The apparatus includes a communication interface configured to transmit and receive signals. The apparatus also includes an IP address checker configured to check an IP address of at least one device. The apparatus further includes a group controller configured to register at least one device in a group list classified by user identification information. The apparatus still further includes a controller configured to check an IP address of a device that is requested to be controlled by the control node through the IP address checker, if a control node including a user identifier of the group list requests a control of any one device included in the group list through the communication interface, and send a control command of the control node using the IP address.

According to another aspect of the present invention, a wireless communication system providing an IP-based communication service is provided. The communication system includes at least one device configured to request registration to a control server. The communication system also includes the control server configured to register at least one device requesting registration in a group list classified by user identification information and, if a control node including a user identifier of the group list requests a control of any one device included in the group list, check an IP address of the device that is requested to be controlled by the control node and send a control command of the control node using the IP address.

Other aspects, advantages, and salient features of the invention will become apparent to those skilled in the art from the following detailed description, which, taken in conjunction with the annexed drawings, discloses embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other objects, features and advantages of the present invention will become more apparent from the following detailed description when taken in conjunction with the accompanying drawings in which.

Throughout the drawings, like reference numerals will be understood to refer to like parts, components and structures.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. Embodiments of the present invention will be described herein below with reference to the accompanying drawings. In the following description, well-known functions or constructions are not described in detail since they would obscure the invention in unnecessary detail. Terms described below, which are defined considering functions in the present invention, can be different depending on user and operator's intention or practice. Therefore, the terms should be defined on the basis of the disclosure throughout this specification.

Exemplary embodiments of the present invention that provide a technique for controlling a connection between peripheral nodes in an IP-based wireless communication system will be described.

In the following description, nodes refer to devices that provide IP-based wireless communication functions. For example, the nodes may include a portable terminal using a communication scheme based on the Long Term Evolution (LTE) standard, a Personal Digital Assistant (PDA), and a notebook Personal Computer (PC).

Figure 1:
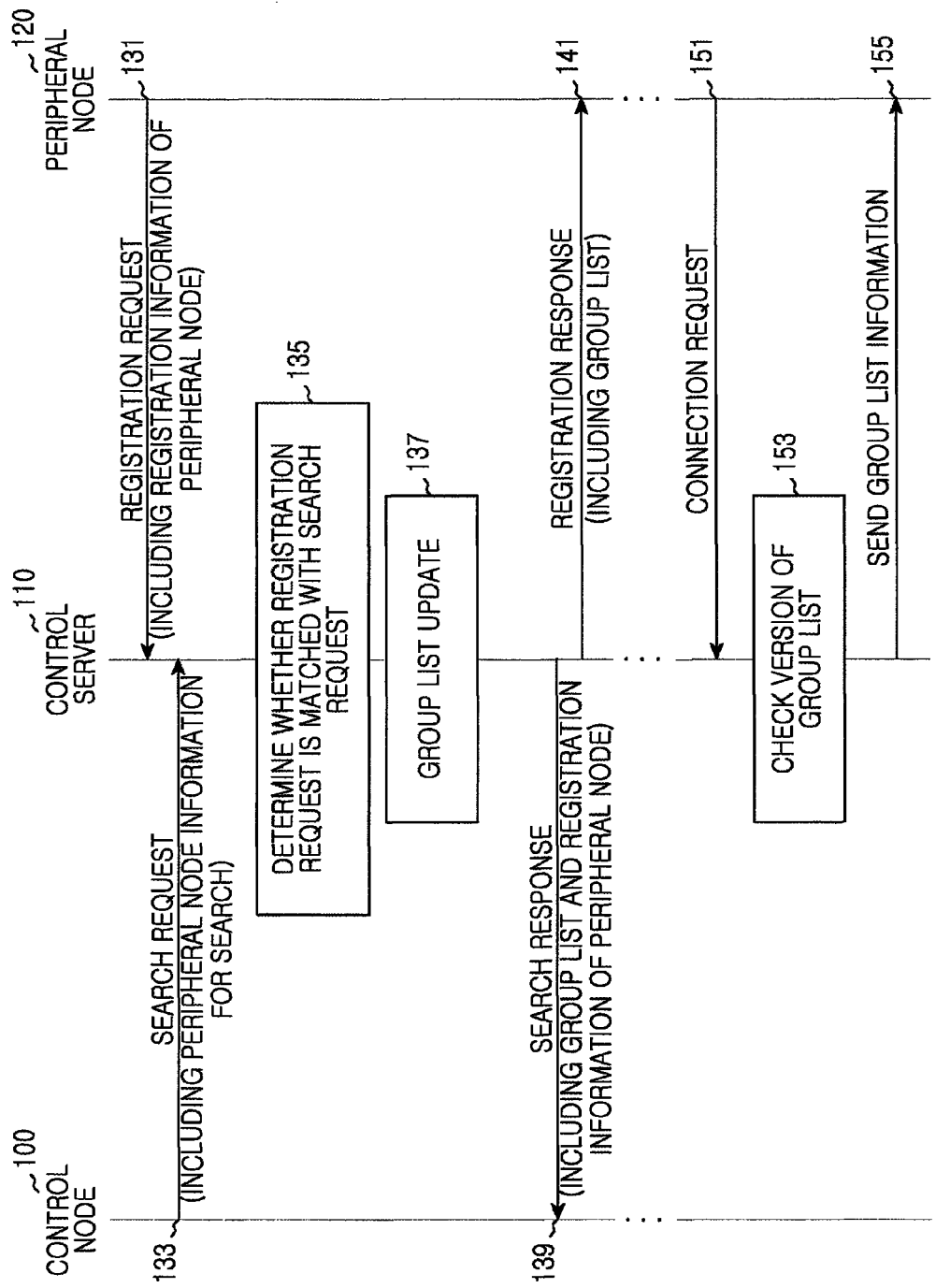
FIG. 1 is a flow diagram illustrating a process of registering peripheral nodes in a wireless communication system according to an embodiment of the present invention.

In the following description, the wireless communication system registers one or more peripheral nodes in a control server, as illustrated in FIG. 1, in order to facilitate the connection between the nodes. The control server manages information of the registered peripheral nodes by grouping based on categories. The control server uses user identification information as the categories for grouping the peripheral nodes. For example, the control server groups the information of the peripheral nodes using phone numbers of users' mobile nodes as a category. In other words, the control server manages the peripheral nodes by interworking the phone numbers of the mobile nodes with IPs of the peripheral nodes.

In the following description, the control node refers to any one node that provides a control command among one or more nodes grouped by the control server, and the peripheral nodes refer to nodes, except the control node, among the grouped nodes. For example, if a user controls other nodes using a mobile device, the mobile device corresponds to the control node and the controlled nodes correspond to the peripheral nodes.

In the following description, the control server refers to a server that controls the control node, a group list of the peripheral nodes, and a connection between the control node and the peripheral nodes. It will be assumed that the control server is a provider server that provides a communication service and knows an IP allocated to each node.

FIG. 1 is a flow diagram illustrating a process of registering peripheral nodes in a wireless communication system according to an embodiment of the present invention. In the following description, it will be assumed that a phone number of a control node 100 is used as a category for grouping peripheral nodes.

As illustrated in FIG. 1, a peripheral node 120 sends a registration request to a control server 110 in step 131. The peripheral node 120 also sends registration information thereof to the control server 110. For example, the peripheral node 120 sends registration information, shown in Table 1 below, to the control server 110.

TABLE 1

| Parameter | Description | Remarks |
|---|---|---|
| Device Type | Node type. Device Type is used for indicating device ion or name in a control node or for classifying categories of nodes. | PMP, digital photo frame, digital camera., MP3, etc. |
| Model Name | Model name is used because a user may have nodes with the same device type. Model Name is used as a registration key. | |
| Serial Number | Serial Number is used as a registration key. | Registration and grouping. |
| Support Ability | 1. Action: node function (reproduction of moving picture, MP3 play, operation of surveillance camera, cleaning) 2. Support Ability, Multimedia format information | |

In Table 1 above, the device type is used for classification of categories in the user interface. When there are many nodes registered in the control server 110, the device type facilitates the expression of the user interface.

The model name and the serial number are used for identifying the peripheral nodes that are being registered.

The support ability includes information on functions that the peripheral nodes requesting registration can support. For example, when the peripheral node requesting registration is a multimedia device, the support ability includes information on codec available in the peripheral node.

When receiving the registration request of the peripheral node 120, the control server 110 maintains a registration waiting state with respect to the peripheral node 120 for a predetermined time. That is, when receiving the registration request of the peripheral node 120, the control server 110 determines whether the control node 110 requests a search for the peripheral node 120 for a predetermined time.

Figure 6B:
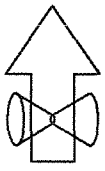
FIG. 6 is a picture showing a user interface provided in a node according to an embodiment of the present invention.
Figure 6A:
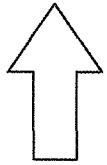
Figure 6C:
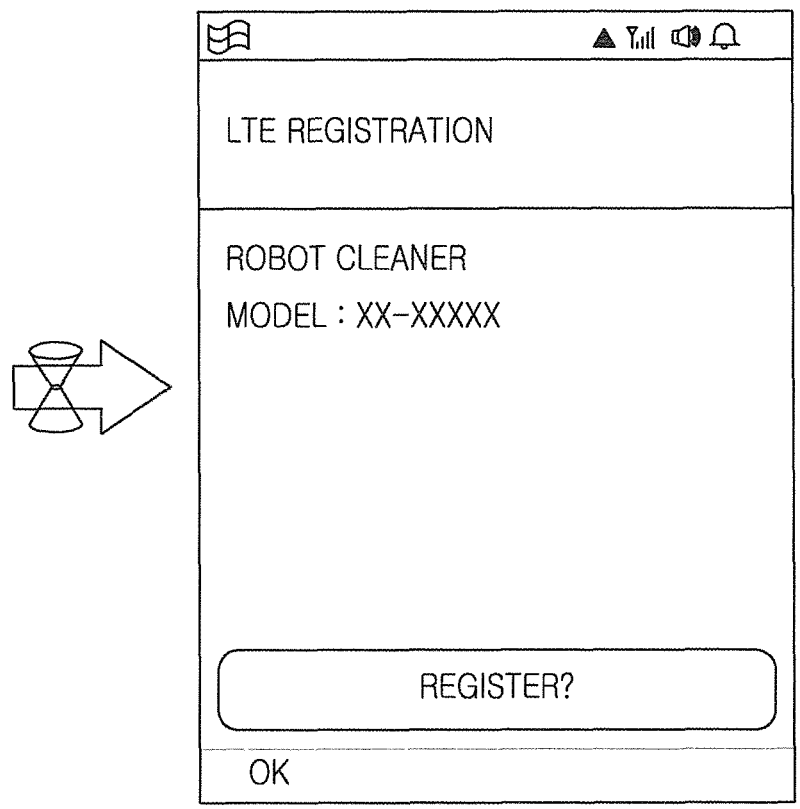

In step 133, the control node 100 requests the control server 110 to search the peripheral node in order to authenticate the peripheral node requesting registration to the control server 110. The control node 100 also sends peripheral node search information to the control server 110. The search information includes the model name and/or the serial number. For example, as illustrated in FIG. 6A, when a search registration menu is selected by a user's manipulation, the control node 100 displays a search information input window, as shown in FIG. 6B, and receives the peripheral node search information from the user. Thereafter, the control node 100 sends a search request signal, including the inputted peripheral node search information, to the control server 110. As illustrated in FIG. 6C, the control node 100 may again determine whether the peripheral node 120 is registered or not, before sending the search request signal.

In step 135, the control server 110 determines whether the registration request of the peripheral node 120 is matched with the search request of the control node 100. For example, the control server 110 determines whether the registration information of the peripheral node 120 is matched with the search information provided from the control node 100. If the registration information of the peripheral node 120 is not matched with the search information provided from the control node 100, the control server 110 cannot authenticate the peripheral node 120 and thus recognizes that the registration of the peripheral node 120 is failed. Although not shown, the control server 110 may send a registration fail signal to the control node 100 and the peripheral node 120.

Alternatively, if the registration information of the peripheral node 120 is matched with the search information provided from the control node 100, the control server 110 can authenticate the peripheral node 120 and thus recognizes that the peripheral node 120 can be registered in a group list.

Accordingly, the control server 110 adds the peripheral node 120 to the group list of the control node 100 in step 137. For example, the control server 110 adds the peripheral node 120 to the group list of the control node 100 grouped by the phone number. Although not shown, the control server 110 may also add the peripheral node 120 to a routing table of the control node 100.

In step 139, the control server 110 sends a response signal to the control node 100 with respect to the search request. The response signal with respect to the search request of the control node 100 includes the registration information of the peripheral node 120 and the updated group list.

In addition, the control server 110 sends a response signal to the peripheral node 120 with respect to the registration request in step 141. The response signal with respect to the registration request of the peripheral node 120 includes a group list of a group in which the peripheral node 120 is registered.

When the peripheral node 120 requests connection to the control server 110 in step 151, the control server 110 checks a version of the group list the peripheral node 120 has in step 153. If the version of the group list the peripheral node 120 has is different from the version of the group list the control server 110 has, the control server 110 sends the group list to the peripheral node 120 in step 155.

In the above-described embodiment, after the peripheral node 120 requests the registration, the control node 100 requests the search. A registration requesting process of the peripheral node 120 and a search requesting process of the control node 100 are performed in parallel. Accordingly, the registration requesting process of the peripheral node 120 and the search requesting process of the control node 100 may be performed at the same time. In addition, after the control node 100 requests the search, the peripheral node 120 may request the registration.

Figure 2:
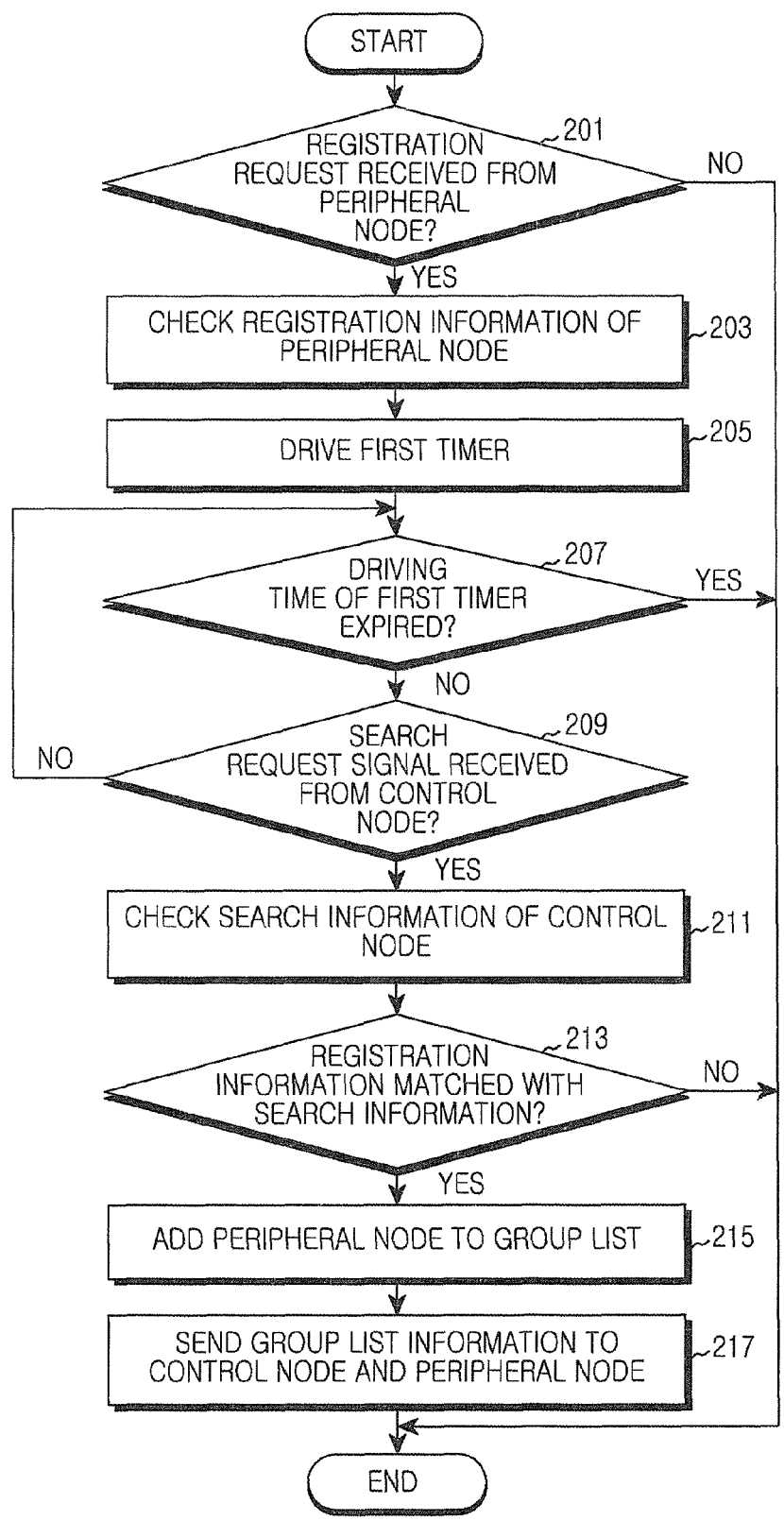
FIG. 2 is a flow diagram illustrating a process of registering peripheral nodes in a control server of a wireless communication system according to an embodiment of the present invention.

FIG. 2 is a flow diagram illustrating a process of registering peripheral nodes in a control server of a wireless communication system according to an embodiment of the present invention.

Referring to FIG. 2, the control server determines whether the peripheral node requests registration in step 201. For example, the control server determines whether a registration request signal is received from the peripheral node.

If the peripheral node does not request the registration, the control server ends the algorithm.

Alternatively, if the peripheral node requests the registration, the control server proceeds to step 203 to check registration information of the peripheral node included in the registration request signal received from the peripheral node. For example, the control server checks the registration information of the peripheral node as shown in Table 1 above.

In addition, if the peripheral node requests the registration, the control server proceeds to step 205 to drive a first timer. The first timer is used for checking a registration waiting time with respect to the peripheral node. That is, the driving time of the first timer is identical to the registration waiting time.

The control server proceeds to step 207 to determine whether the driving time of the first timer is expired.

If the driving time of the first timer is expired, the control server cannot authenticate the peripheral node and thus recognizes that the registration of the peripheral node is failed. Accordingly, the control server ends the algorithm. Although not shown, the control server may send a registration fail signal to the control node and the peripheral node.

Alternatively, if the driving time of the first timer is not expired, the control server proceeds to step 209 to determine whether the control node requests the search. For example, the control server determines whether a search request signal is received from the control node.

If the control node does not request the search, the control server proceeds to step 207 to determine whether the driving time of the first timer is expired.

Alternatively, if the control node requests the search, the control server proceeds to step 211 to check the search information of the control node included in the search request signal received from the control node. If the control node requests the search, the control server terminates the driving of the first timer. The search information includes a model name and/or a serial number of the peripheral node.

Then, the control server proceeds to step 213 to determine whether the registration request of the peripheral node is matched with the search request of the control node. For example, the control server determines whether the registration information of the peripheral node is matched with the search information of the control node.

If the registration information of the peripheral node is not matched with the search information of the control node, the control server cannot authenticate the peripheral node and thus recognizes that the registration of the peripheral node is failed. Accordingly, the control server ends the algorithm. Although not shown, the control server may send a registration fail signal to the control node and the peripheral node.

Alternatively, if the registration information of the peripheral node is matched with the search information of the control node, the control server can authenticate the peripheral node and thus recognizes that the peripheral node can be registered in the group list of the control node. Accordingly, the control server proceeds to step 215 to add the peripheral node to the group list of the control node. For example, the control server adds the peripheral node to the group list grouped by the phone number of the control node. Although not shown, the control server may add the peripheral node to a routing table of the control node.

After the peripheral node is added to the group list, the control server proceeds to step 217 to send group list information to the control node and the peripheral node.

Then, the control server ends the algorithm.

In the above-described embodiment, the control server registers and groups the peripheral node using the registration request signal and the search request signal that are received from the peripheral node and the control node, respectively.

In another embodiment, the control server may receive the peripheral node information directly from the user or the provider, and register and group the corresponding peripheral node. In such an embodiment, the user includes the control node.

A method for controlling peripheral nodes using a group list and a control server will be described below.

Figure 3:
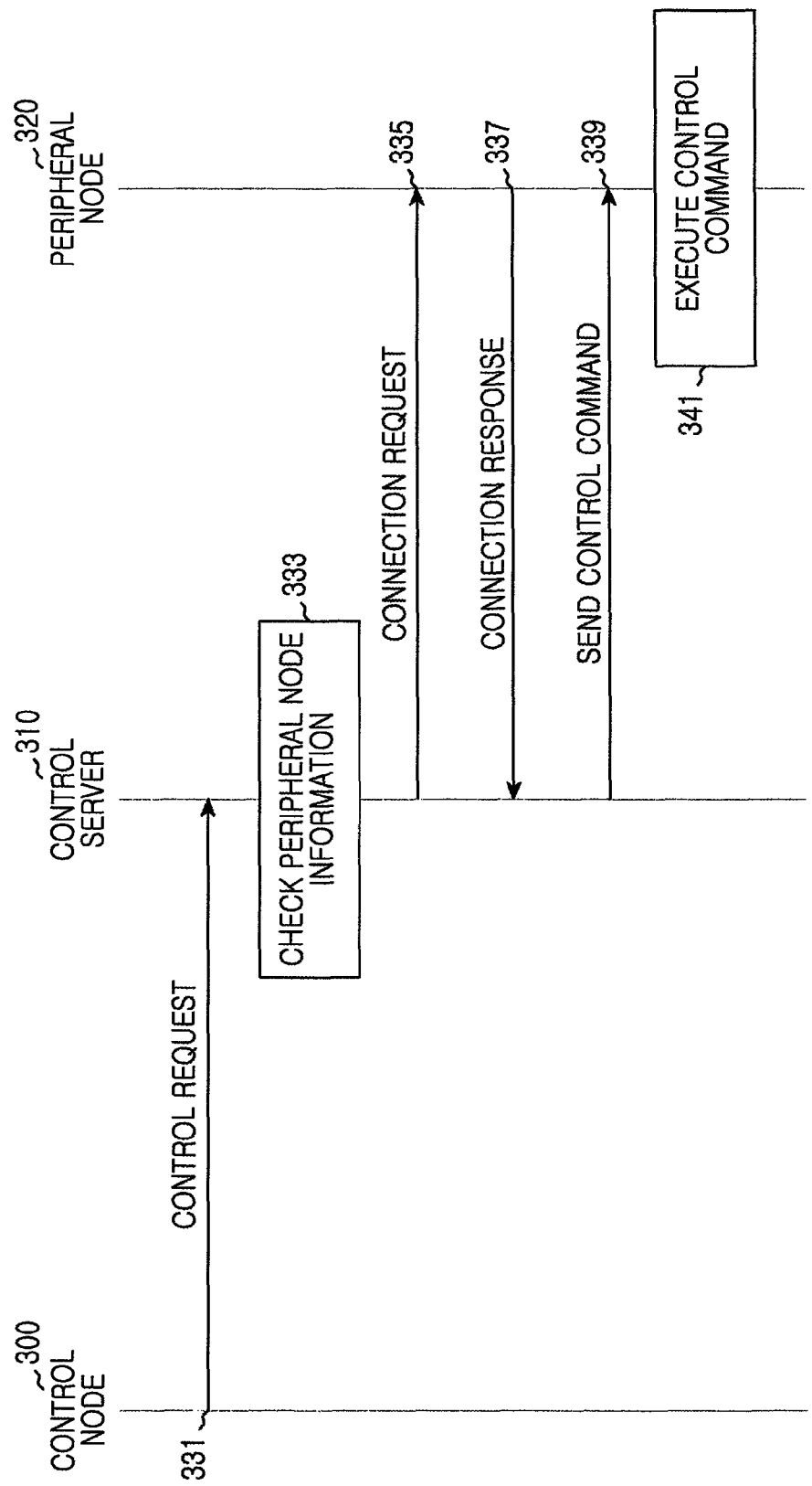
FIG. 3 is a flow diagram illustrating a process of connecting nodes in a wireless communication system according to an embodiment of the present invention.

FIG. 3 is a flow diagram illustrating a process of connecting nodes in a wireless communication system according to an embodiment of the present invention.

Figure 6E:
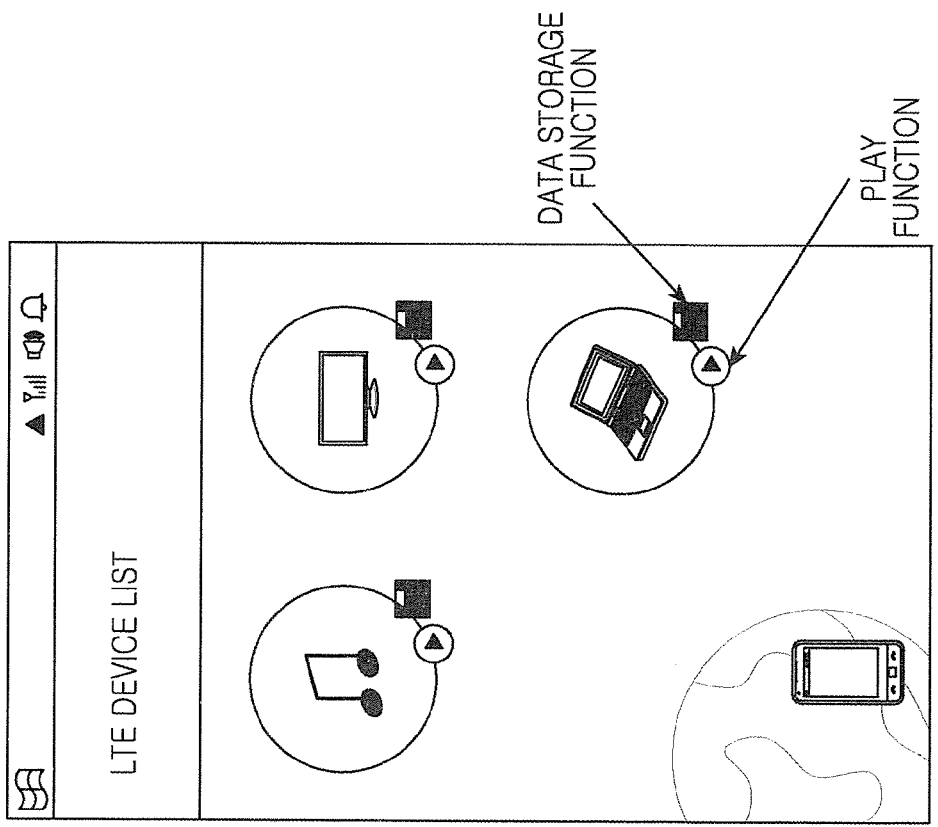
Figure 6D:
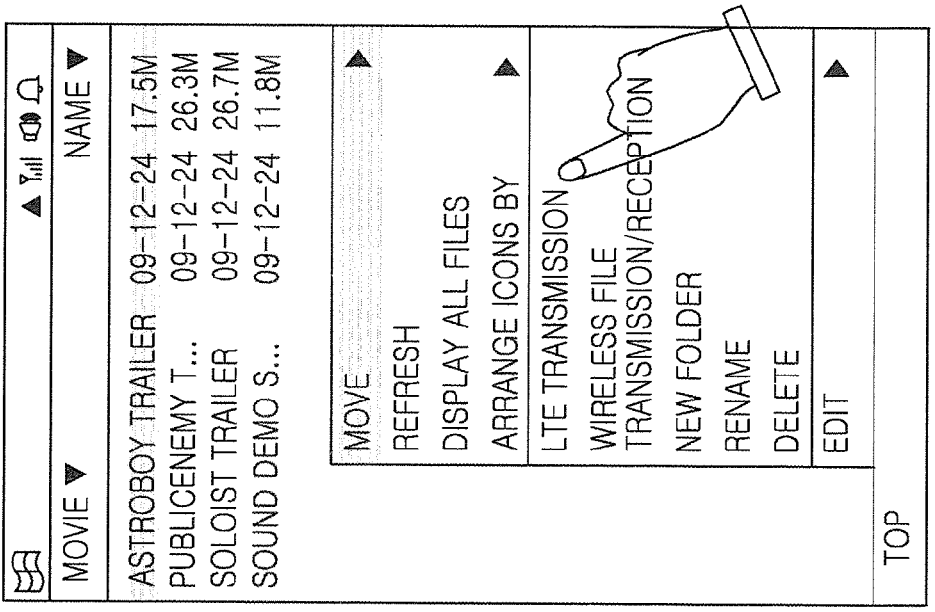

As illustrated in FIG. 3, a control node 300 requests a control of a peripheral node 320 to a control server 310 in order to control the peripheral node 320 included in a group list in step 331. The control node 300 sends a group identifier of the peripheral node 320 and control command information to the control server 310. The group identifier of the peripheral node 320 represents an index of the peripheral node 320 in a group list that uses a phone number of the control node 300 as a category. For example, as illustrated in FIG. 6D, if a peripheral node control command (e.g., LTE transmission) is selected by a user's manipulation, the control node 300 displays the peripheral node information, which is included in the group list, and function information, which can be provided by each peripheral node, as illustrated in FIG. 6E. If a notebook PC is included in the group list, the control node 300 displays information indicating that the notebook PC can provide a data storage function and a play function. Thereafter, if the peripheral node 320 to be controlled and the function to be controlled are selected by a user's manipulation, the control node 300 requests the control of the corresponding peripheral node 320 to the control server 310.

In step 333, the control server 310 checks information of the peripheral node 320 which is requested to be controlled by the control node 300. For example, the control server 310 checks registration information of the peripheral node 320 through the group identifier of the peripheral node 320. In step 335, the control server 310 requests connection to the peripheral node 320 using an IP address matched with the group identifier of the peripheral node 320 checked in a routing table.

If the control server 310 requests the connection, the peripheral node 320 determines whether an operation state thereof is an active state or an idle state. If the peripheral node 320 is in an idle state, the peripheral node 320 is switched to an active state.

In step 337, the peripheral node 320 sends a response signal, including active state information, to the control server 310.

In step 339, if the peripheral node 320 is in the active state, the control server 310 sends a control command of the control node 300 to the peripheral node 320.

In step 341, the peripheral node 320 executes the control command received from the control server 310. For example, if the peripheral node 320 is a robot cleaner, the robot cleaner may perform a cleaning function under the control of the control node 300.

If the control server 310 does not receive the response signal from the peripheral node 320 for a predetermined time, the control server 310 recognizes that it cannot control the peripheral node 320. Accordingly, the control server 310 may send a control fail signal to the control node 300.

In the above-described embodiment, when the control server 310 requests the connection to the peripheral node 320, the peripheral node 320 determines whether an operation state thereof is an active state or an idle state.

In another embodiment, when the control server 310 requests the connection to the peripheral node 320, the peripheral node 320 may check the operation state thereof and determine whether it can execute the control command of the control node 300. Then, the peripheral node 320 sends a response signal, including whether the peripheral node 320 executes a control command, to the control server 310. If the peripheral node 320 can perform the control command, the control server 310 sends the control command of the control node 300 to the peripheral node 320. Alternatively, if the peripheral node 320 cannot perform the control command, the control server 310 recognizes that it cannot control the peripheral node 320.

A method for controlling data transmission between peripheral nodes using a group list and a control server will be described below.

Figure 4:
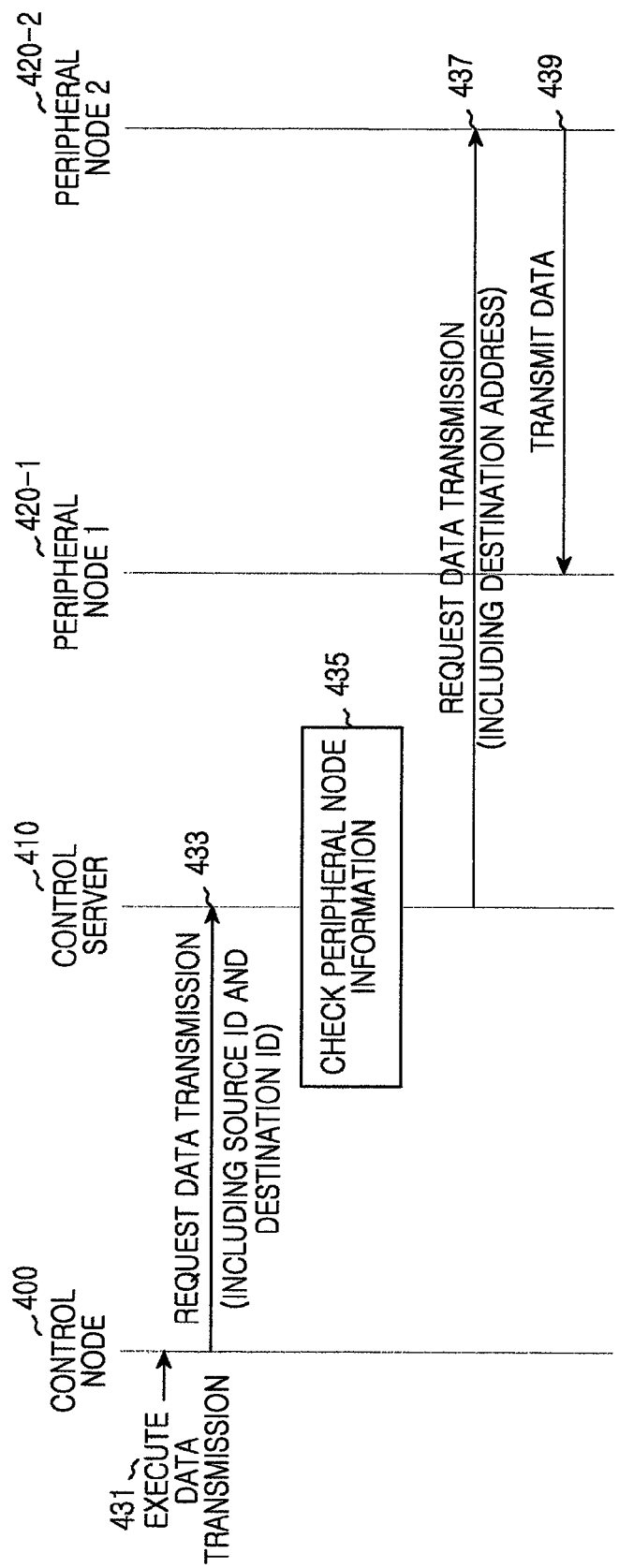
FIG. 4 is a flow diagram illustrating a process of connecting nodes in a wireless communication system according to another embodiment of the present invention.

FIG. 4 is a flow diagram illustrating a process of connecting nodes in a wireless communication system according to another embodiment of the present invention.

As illustrated in FIG. 4, if a data transmission event between peripheral nodes is generated in step 431, a control node 400 requests data transmission to the control server 410 in step 433. The control node 400 sends a group identifier of a source node, a group identifier of a destination node, and control command information to the control server 410. The group identifier of the source node represents an index of a peripheral node 2 420-2, which is to transmit data, in the group list that uses a phone number of the control node 400 as a category, and the group identifier of the destination node represents an index of a peripheral node 1 420-1 that receives data in the group list that uses the phone number of the control node 400 as a category.

In step 433, the control server 410 checks the information of the peripheral node 1 420-1 and the peripheral node 2 420-2 which are requested to be controlled by the control node 400. For example, the control server 410 checks IP addresses matched with the group identifiers of the source node and the destination node in a routing table.

In step 435, the control server 410 requests data transmission to the peripheral node 2 420-2 using the checked IP address of the source node. The control server 410 also sends the IP address information of the destination node to the peripheral node 2 420-2.

In step 439, the peripheral node 2 420-2 transmits data to the peripheral node 1 420-1 using the IP address of the destination node received from the control server 410.

The configuration of the control server for controlling communication between the nodes as described above will be described below.

Figure 5:
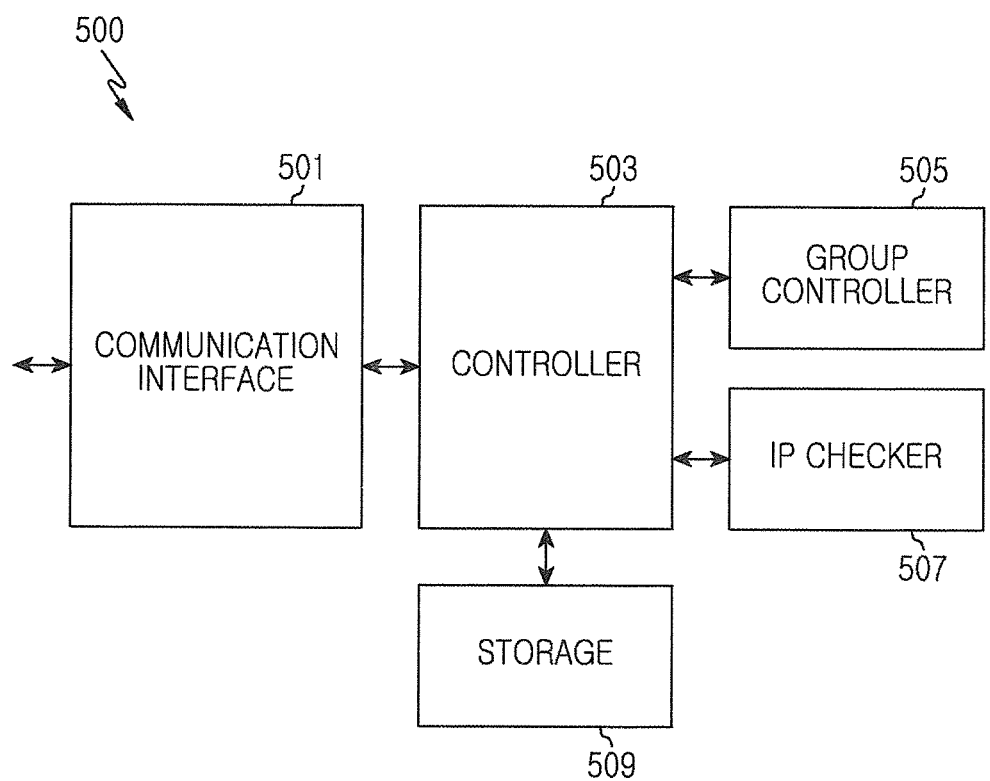
FIG. 5 is a block diagram of a control server in a wireless communication system according to an embodiment of the present invention.

FIG. 5 is a block diagram of a control server in a wireless communication system according to an embodiment of the present invention.

As illustrated in FIG. 5, the control server 500 includes a communication interface 501, a controller 503, a group controller 505, an IP checker 507, and a storage 509.

The communication interface 501 transmits/receives a signal to/from at least one node.

The controller 503 controls an overall operation of the control server 500. That is, the controller 503 controls nodes registered in the control server 500 and controls communication between the nodes. As one example, as illustrated in FIG. 3, if the control node requests the control of the peripheral node, the controller 503 checks an IP address of the peripheral node through the IP checker 507. Then, the controller 503 sends a control command of the control node to the peripheral node using the IP address. As another example, as illustrated in FIG. 4, if the control node requests data communication between a source node to a destination node, the controller 503 checks the IP addresses of the source node and the destination node through the IP checker 507. Then, the controller 503 instructs data transmission to the source node using the IP address of the source node. The controller 503 also sends the IP address of the destination node to the source node.

The group controller 505 generates a group by user identifier under the control of the controller 503. For example, as illustrated in FIG. 2, when the registration request of the peripheral node is matched with the search request of the control node, the group controller 505 adds the peripheral node to the group list of the control node.

In addition, the group controller 505 may check a version of the group list of the peripheral node requesting the connection, and update the group list of the peripheral node. For example, the group controller 505 may check the version of the group list of the peripheral node requesting the connection, as indicated in steps 151 to 155 in FIG. 1, and update the group list of the peripheral node.

The IP checker 507 checks the IP allocated to each node in a network.

The storage 509 stores information necessary for the driving of the control server 500. For example, the storage 509 stores the group list created by the group controller 505.

As described above, the peripheral nodes are managed by grouping using the user identifier information as the category in the IP-based wireless communication system. Therefore, the mobile node can easily connect to and control the correspondent node, even when it does not know the IP of the correspondent node.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method, implemented by a control server of a wireless communication system that provides an Internet Protocol (IP) based communication service, to control a connection between a control node and one or more devices, the method comprising:
registering, at the control server, the one or more devices into a group list classified by user identification information of the control node;
receiving, at the control server, a control request signal from the control node;
identifying, at the control server, a device corresponding to the control request signal in the group list;
identifying, at the control server, an IP address of the identified device; and
transmitting a control command of the control node to the identified device using the identified IP address.

2. The method of claim 1, wherein the user identification information includes one or more phone numbers of the respective devices.

3. The method of claim 1, wherein the registering of the one or more devices comprises:
checking registration information of a device requesting registration;
when any one device requests a search, checking search request information received from the device requesting the search; and
when the registration information is matched with the search request information, adding the device requesting the registration to a group list classified by user identification information of the device requesting the search.

4. The method of claim 3, wherein the registration information includes at least one of a device type, a model name, a serial number, and a supportable function.

5. The method of claim 3, wherein the search request information includes at least one of a model name and a serial number of a device for the search.

6. The method of claim 1, further comprising, after registering the one or more devices in the group list, transmitting group list information to the one or more devices registered in the group list.

7. A control server to control a connection between a control node and one or more devices of a wireless communication system providing an Internet Protocol (IP) based communication service, the control server comprising:
a communication interface configured to transmit and receive signals;
an IP address checker configured to check an IP address of at least one device of the one or more devices;
a group controller configured to register the one or more devices in a group list classified by user identification information of the control node; and
a controller configured to:
receive a control request signal from the control node through the communication interface,
identify a device corresponding to the control request signal in the group list,
identify an IP address of the identified device through the IP address checker, and
control a transmission of a control command of the control node to the identified device using the IP address.

8. The control server of claim 7, wherein the group controller is configured to use one or more phone numbers of the respective one or more device as the user identification information.

9. The control server of claim 7, wherein when at least one device requests registration, the group controller is configured to check registration information of the device requesting registration,
when any one device requests a search, the group controller is configured to check search request information received from the device requesting the search, and
when the registration information is matched with the search request information, the group controller is configured to add the device requesting the registration to a group list classified by user identification information of the device requesting the search.

10. The control server of claim 9, wherein the registration information includes at least one of a device type, a model name, a serial number, and a supportable function.

11. The control server of claim 9, wherein the search request information includes at least one of a model name and a serial number of the device for the search.

12. The control server of claim 7, wherein after registering the devices in the group list, the group controller is configured to transmit group list information to the one or more devices registered in the group list.

13. A wireless communication system providing an Internet Protocol (IP) based communication service, comprising:
one or more devices configured to request registration to a control server; and
the control server configured to:
register the one or more devices requesting registration into a group list classified by user identification information of a control node,
receive a control request signal from the control node;

identify a device corresponding the control request signal in the group list;
identify an IP address of the identified device, and transmit a control command of the control node to the identified device using the identified IP address.

14. The wireless communication system of claim 13, wherein the control server is configured to check the IP address of the device.

15. The wireless communication system of claim 13, wherein the control server is configured to use one or more phone numbers of the respective one or more devices as the user identification information.

16. The wireless communication system of claim 13, wherein:
the control server is configured to check registration information of a device requesting registration,
when any one device requests a search, the control server is configured to check search request information received from the device requesting the search, and
when the registration information is matched with the search request information, the control server is configured to add the device requesting the registration to the group list classified by user identification information of the device requesting the search.

17. The wireless communication system of claim 16, wherein the registration information includes at least one of a device type, a model name, a serial number, and a supportable function.

18. The wireless communication system of claim 16, wherein the search request information includes at least one of a model name and a serial number of the device for the search.

19. The wireless communication system of claim 13, wherein after registering the devices in the group list, the control server is configured to transmit group list information to the one or more devices registered in the group list.

20. The wireless communication system of claim 13, wherein the control node is configured to be controlled by the control server.

* * * * *